No. 759,999. PATENTED MAY 17, 1904.
R. KUHN.
MOTOR VEHICLE.
APPLICATION FILED OCT. 29, 1903.
NO MODEL.
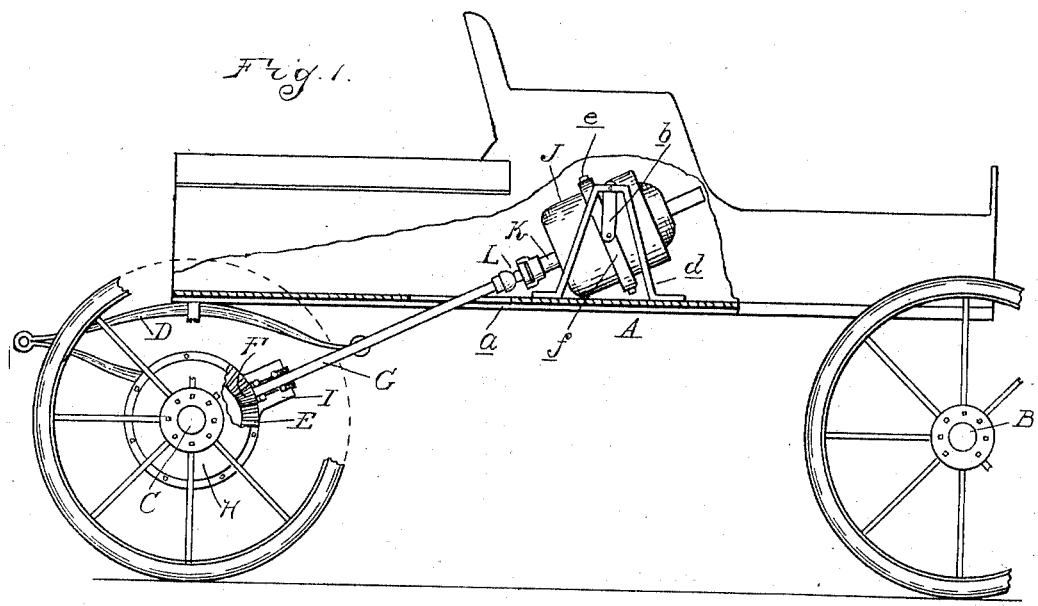
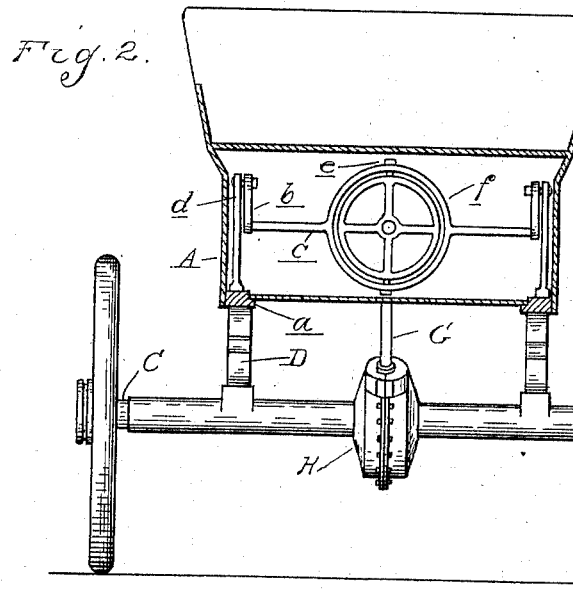
Witnesses
Geo. N. Graves
Jas. P. Barry
Inventor
Robert Kuhn
By James Whittemore
atty.

No. 759,999. Patented May 17, 1904.

UNITED STATES PATENT OFFICE.

ROBERT KUHN, OF DETROIT, MICHIGAN.

MOTOR-VEHICLE.

SPECIFICATION forming part of Letters Patent No. 759,999, dated May 17, 1904.

Application filed October 29, 1903. Serial No. 178,990. (No model.)

*To all whom it may concern:*

Be it known that I, ROBERT KUHN, a citizen of the United States, residing at Detroit, in the county of Wayne and State of Michigan, have invented certain new and useful Improvements in Motor-Vehicles, of which the following is a specification, reference being had therein to the accompanying drawings.

The invention relates to motor-vehicles of that type in which motion is imparted to the drive-axle through the medium of a rotary transmission-shaft extending longitudinally of the vehicle and connected with a motor supported by the vehicle-frame.

The invention has more particular reference to means employed for driving the rotary transmission whereby the oscillations of the frame relative to the axle will not cause any binding upon the moving parts.

To this end the invention consists in the arrangement of a rotary driver having a flexible connection with the longitudinally-extending transmission-shaft and a limited free movement in relation to the frame; further, in the arrangement and manner of supporting the motor, and, further, in the peculiar construction, arrangement, and combination of parts, as hereinafter set forth.

In the drawings, Figure 1 is a sectional elevation of a motor-vehicle to which my improvements are applied. Fig. 2 is a cross-section illustrating the manner of supporting the motor on the vehicle-frame.

A is the vehicle-frame, which, as shown, is formed integral with the vehicle-body and comprises the longitudinally-extending side sills $a$.

B and C are respectively the front and rear axles upon which the frame and body are supported through the medium of suitable springs. As shown, the rear axle C has secured thereto the elliptic springs D, which support the rear end of the body. The connection between the forward axle and body, as well as the steering-gear, may be of any suitable construction and is not illustrated, as it forms no part of the present invention.

E is a beveled gear-wheel secured to the revoluble axle C, and F is a beveled pinion meshing with said gear and secured to the longitudinally-extending rotary transmission-shaft G. These beveled gears are preferably inclosed in a suitable housing H, which also extends to inclose the rotary axle and has formed thereon the bearing to which the springs D are secured. The housing H is further preferably provided with a bearing I for supporting the rotary transmission-shaft G, a pulley-bearing being shown in Fig. 1.

By the construction described the rotary transmission-shaft G is held in fixed relation to the axle C, and the housing H and bearing I serve also to hold said shaft from swinging about the axle C. Thus the shaft is held in substantially fixed position with its forward end projecting upward into operative relation to the motor carried by the frame. The motor may be of any suitable construction in which the force employed is converted into rotary motion, the axis of rotation extending longitudinally of the body. As shown, an electric motor is employed, in which J is the motor-casing and K is the drive-shaft, journaled in bearings in said casing and extending out therefrom in a rearward direction. The shaft K is connected to the rotary transmission-shaft G through the medium of a flexible connection or universal coupling L. This flexible connection permits of an angular movement of the shafts K and G in relation to each other without interfering with the rotary transmission. Inasmuch, however, as any change in position of the vehicle-frame in relation to the transmission-shaft G will alter the angular relation of the shaft K to said frame, it is necessary that said shaft should be provided with a limited freedom of movement upon the frame. In the construction shown this freedom of movement of the shaft K is provided by supporting the motor J on a swinging frame comprising the pivotal links $b$, which at their lower ends connect with a cross bar or frame $c$ and at their upper ends are pivoted to brackets $d$, secured to the sills $a$. The central portion $f$ of the bar $c$ is of annular form and is adapted to embrace the motor-casing K.

$e$ represents pivots connecting the annular portion *f* of the bar *c* with the motor-casing, said pivots extending substantially perpendicular to the axis of the bar *c*.

With the construction just described it is evident that the motor-casing J and the shaft K journaled therein are free to change their angular relation to the frame. Furthermore, by reason of the link connection *b* the casing J is free to move longitudinally in relation to the frame, and thus a limited universal freedom of movement is given to the motor. At the same time the weight of the motor is carried by the frame, and the casing J is firmly held from rotation around the axis of the shaft K.

In operation the oscillations of the frame A upon its spring-supports will cause a change in relative position of the forward end of the shaft G. Furthermore, the oscillations in the spring D may permit of a slight swinging oscillation of the shaft G in relation to the axle C. None of these movements will, however, effect the driving of the shaft G by the motor, for the reason that the latter is free both to change the angularity of its axis and also to move longitudinally in relation to the frame. This construction, in connection with the flexible or universal coupling L, will prevent any binding of the moving parts of the mechanism about the oscillations of the frame.

What I claim as my invention is—

1. In a motor-vehicle, the combination of a drive-axle and a frame yieldably supported thereon, a rotary transmission-shaft extending from said axle longitudinally of said frame, and a motor for the axle, said motor being pivotally secured to and housed within the vehicle-body.

2. In a motor-vehicle, the combination with a drive-axle and a frame yieldably supported thereon, of a rotary transmission-shaft extending from said axle longitudinally of the frame, a motor for the shaft, an annular ring extending around the motor-casing and pivoted thereto, and pivotal connections between said ring and the vehicle-frame.

3. In a motor-vehicle the combination with a drive-axle and a frame yieldingly supported thereon, of an upwardly-extended elongated rotary transmission-shaft extending from said axle through the bottom of said frame, and a motor supported upon said frame having a flexible connection with said shaft, and a limited freedom of movement on said frame.

4. In a motor-vehicle, the combination with a drive-axle and a frame yieldingly supported thereon, of a rotary transmission-shaft extending from said axle longitudinally of said frame, and a rotary motor having a swinging engagement with upwardly-extended supports on said frame, and a flexible connection with said transmission-shaft.

5. In a motor-vehicle, the combination with a drive-axle and a frame yieldingly supported thereon, of a rotary transmission-shaft extending from said axle longitudinally of said frame, a rotary motor having a flexible connection with said transmission-shaft, and a swinging supporting-frame for said motor, resting upon the upper surface of the bottom of said vehicle-frame, having a pivotal connection with the motor-body in a plane transverse to the axis.

6. In a motor-vehicle, the combination with a drive-axle and a frame yieldably supported thereon, of a rotary transmission-shaft extending from said axle longitudinally of the frame, a motor for the shaft, a support for the motor comprising upwardly-extended brackets upon the vehicle-frame at the respective sides of the motor, and downwardly-extended links, the opposite ends of which having pivotal engagement respectively with said support and the motor-casing.

7. In a motor-vehicle, the combination with a drive-axle and a frame yieldably supported thereon, of a rotary transmission-shaft, extending from said axle longitudinally of the frame, a motor for the shaft, an annular ring extending around the motor-casing and pivoted thereto, and swinging links upon the vehicle-frame, having a pivotal engagement with the ring transversely to the latter's pivotal engagement with the motor-casing.

8. In a motor-casing, the combination with a drive-axle and a frame yieldably supported thereon, of a rotary transmission-shaft extending from said axle longitudinally of the frame, a motor for the shaft, a ring pivoted at its top to the top of the motor-casing, and at its sides to said vehicle-frame.

9. In a motor-vehicle, the combination with a drive-axle, and a frame yieldably supported thereon, of a rotary transmission-shaft extending from said axle longitudinally of the frame, a motor for the shaft, a supporting-ring passing around the motor-casing and pivoted thereto, and supports upon the vehicle-frame for the ring.

10. In a motor-vehicle, the combination with a drive-axle and a frame yieldably supported thereon, of a rotary transmission-shaft extending from said axle longitudinally of the frame, a motor for the shaft, a ring passing around the motor-casing and pivoted thereto, said ring having laterally-extended arms at its respective sides pivotally engaging supports at the opposite sides of the vehicle-frame.

11. In a motor-vehicle, the combination with a drive-axle, and a vehicle-body supported thereon, of a motor, a transmission-shaft operatively associated at one end with said shaft and at its opposite end with the motor, and means for pivoting the motor, whereby the same may swing longitudinally and laterally.

12. In a motor-vehicle, the combination with a drive-axle and a vehicle-body supported thereon, of a transmission-shaft operatively associated with said axle and a motor for the shaft, said motor being inclosed by a suitable casing, and pivotally supported upon the upper surface of the bottom of the vehicle-body.

13. In a motor-vehicle, the combination with a drive-axle and a body-frame yieldably supported thereon, of a rotary transmission-shaft extending from said axle longitudinally of the frame, a motor having a flexible connection with said shaft, said motor being housed within the vehicle-body, and means for pivotally supporting the motor within the body.

14. In a motor-vehicle, the combination with a drive-axle and a body-frame yieldably supported thereon, of a rotary transmission-shaft extending from said axle longitudinally of the frame, a motor having a flexible connection with said shaft, said motor being housed within the vehicle-body, and means for pivoting the motor within the body whereby the same may swing longitudinally and laterally.

In testimony whereof I affix my signature in presence of two witnesses.

ROBERT KUHN.

Witnesses:
   JAMES P. BARRY,
   EMMA I. BARNES.